Oct. 17, 1933.  H. L. MUELLER  1,931,152
METHOD OF MAKING DISK WHEELS
Filed March 28, 1931  2 Sheets-Sheet 1
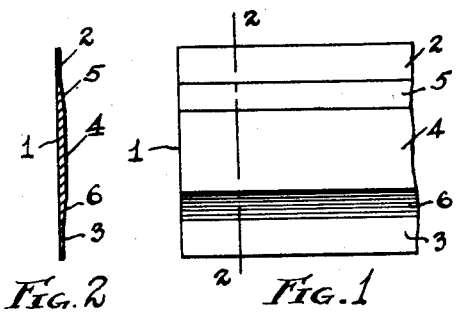
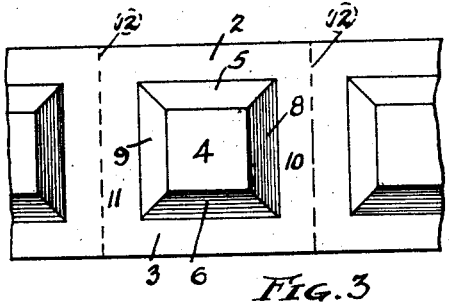
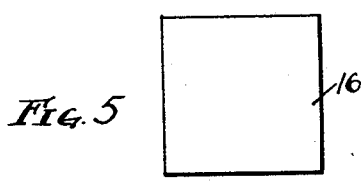
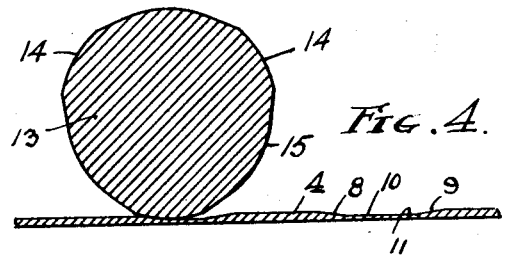
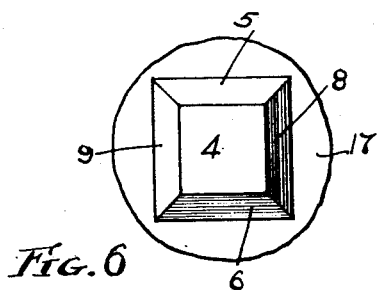
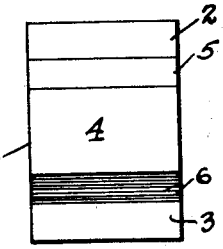
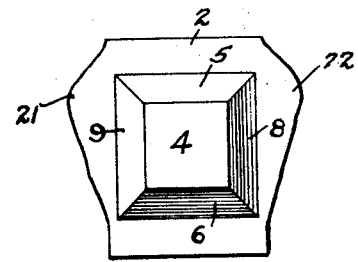
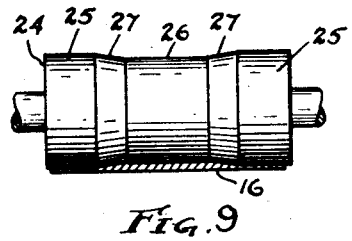
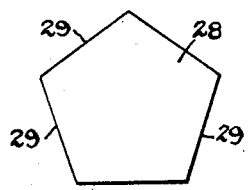
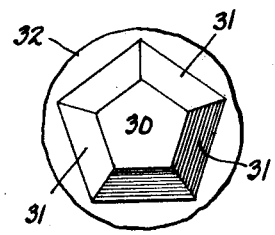
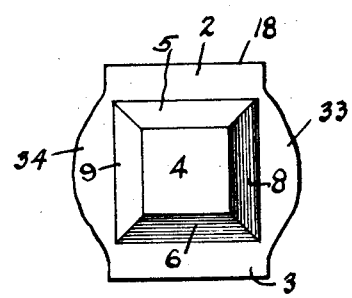
INVENTOR.
Homer L. Mueller
BY
Fay, Oberlin & Fay
ATTORNEYS Oct. 17, 1933.  H. L. MUELLER  1,931,152
METHOD OF MAKING DISK WHEELS
Filed March 28, 1931  2 Sheets-Sheet 2

INVENTOR.
Homer L. Mueller
BY
Fay, Oberlin & Fay
ATTORNEYS

Patented Oct. 17, 1933

1,931,152

UNITED STATES PATENT OFFICE 1,931,152

METHOD OF MAKING DISK WHEELS

Homer L. Mueller, Cleveland, Ohio, assignor to The Cleveland Welding Company, Cleveland, Ohio, a corporation of Ohio Application March 28, 1931. Serial No. 525,998

1 Claim. (Cl. 80—16)

The present invention, as indicated, relates to a novel form of disk wheel designed primarily for use on automotive vehicles. More particularly it pertains to a type of wheel having a tapered web, so that the distribution of the metal will be proportionate to the stresses to which the wheel is subjected. By tapering the wheel radially from the hub to the rim, the greatest quantity of metal is placed at the points subjected to the greatest bending moments caused by lateral stresses. A further novel feature resides in the provision of radially positioned portions corresponding to spokes which are adapted to add greater strength to compensate for the vertical forces exerted upon the wheel.

A further object of my invention is to provide a unique and efficient method for the manufacture of such disk wheels. Heretofore, the production of such wheels by stamping and forging processes has proven to be relatively expensive while at the same time the resultant product was susceptible to dangerous weakness due to the setting up of internal stresses in the metal. In contrast, my method of manufacture is almost entirely a rolling process, the economies of which are obvious as compared to the more expensive processes contemplated in the prior art. To the accomplishment of the foregoing and related ends, said invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 13:
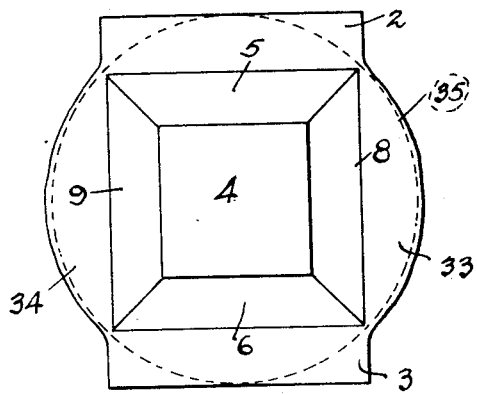
Figure 14:
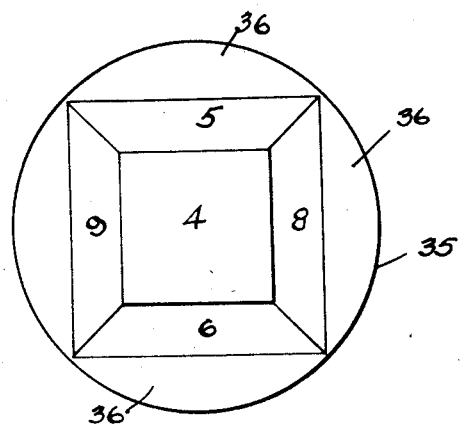
Figure 16:
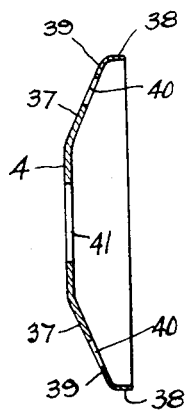
Figure 15:
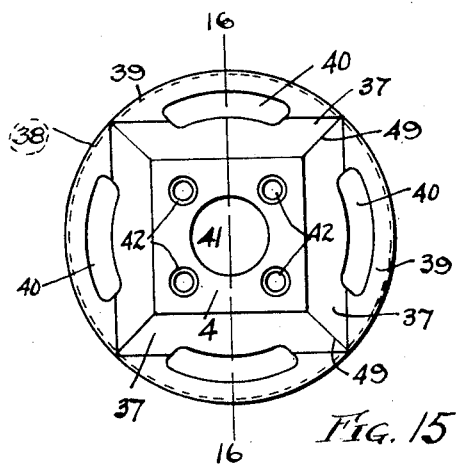
Figure 17:
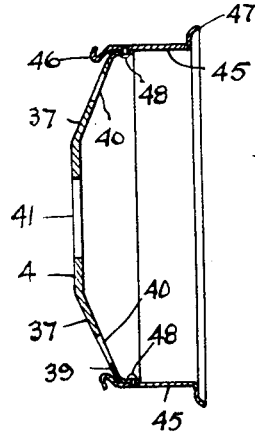

In said annexed drawings:

Fig. 1 is a plan view of a mill section upon which the initial steps of deformation are carried out; Fig. 2 is a section along line 2—2 of Fig. 1; Fig. 3 is a plan view of the mill section of Fig. 1 after being subjected to deformation by the cam roll; Fig. 4 is a section showing the cam roll in position upon the mill section of Fig. 1; Figs. 5, 6, 7, 8 and 12 illustrate alternative rolling processes; Fig. 9 is an elevation of the uniform roll in position upon the mill section; Figs. 10 and 11 are illustrative of rolling processes in the production of an alternative form of wheel; Figs. 13 and 14 are plan views showing the form in which the previously deformed blanks are trimmed and circularized; Fig. 15 is a plan view of the completed disk; Fig. 16 is a section taken along line 16—16 of Fig. 15; Fig. 17 is a sectional elevation showing a rim member riveted in position upon the wheel disk.

Referring more particularly to Figs. 1 and 2, there is first provided a mill section 1 having lateral flat portions 2 and 3 and a central raised portion 4 with the beveled sides 5 and 6. The mill section 1 may be first subjected to a passage of a cam roll 13. Such cam roll 13 has raised portions 14 and depressions 15 which produce the beveled edges 8 and 9 adjacent the raised portion 4 of the mill section and transversely of the beveled edges 5 and 6. As shown in Fig. 3, the resultant blanks may then be sheared along the lines 12—12. An alternative method of rolling a substantially equivalent blank may be performed by subjecting the square blank 16 of Fig. 5 having uniform thickness to a double pass of the uniform roll shown in Fig. 9. The resultant product will be substantially in the form of the blank illustrated in Fig. 6, namely that of a frustum of a square pyramid mounted upon a flat circular base 17.

Still another method of producing the preformed blank substantially similar to that of Figs. 3 and 6 may be accomplished by a single transverse pass of the uniform roll of Fig. 9 over the mill section blank 18 shown in Fig. 7. The resultant product of the latter rolling process will correspond substantially to the preformed blank shown in Fig. 8 in which the flat base portions 21 and 22 appear on the upper lateral portions of the blank.

The uniform roll 24, Fig. 9, has the lateral cylindrical portions 25 with the intermediate cylindrical portion 26 of lesser diameter than that of the portions 25. The conical surfaces 27 serve to join the cylindrical portions 25 and 26 and to produce the resultant beveled edges 8 and 9 upon the mill section 16.

A further method of rolling the mill section 18 may be accomplished by the longitudinal passage of the cam roll 13 over said blank 18. The result of such an operation as illustrated in Fig. 12 will be that of a frustum of a right pyramid 4 positioned upon a flat base having the laterally curved portions 33 and 34.

After the blank has been formed by any one of the above described processes, it is next subjected to a circularizing and trimming action as shown in Figs. 13 and 14. The form produced will then substantially be that of a truncated right pyramid having the upper surface 4, the lateral surfaces 5, 6, 8 and 9, said pyramid being mounted upon the circular flat base 35, with the arcuate flat portions 36 contiguous to the lateral surfaces of the pyramid.

Referring to Figs. 13, 14 and 15, it should be noted that the width of the base of the pyramid thus formed is substantially equal to the diameter of the completed wheel.

As shown in Figs. 15 and 16, the blank 36 of Fig. 14 is next subjected to a stamping process whereby the angularly inclined web portions 37 are bent in. The arcuate portions 36 are transformed into the conical sections 39 integral and contiguous with the transverse circular portion 38. For the purposes of securing the wheel disk to the hub, the bolt holes 42 are provided, as well as the central hole 41 which is adapted to receive the wheel axle.

In order to place the wheel in completed form, a tire rim-carrying element 45 having the annular rim-retaining means 46 and 47 is then secured to the disk by means of rivets 48 or similar equivalent fastening means.

By resorting to the expedient of cutting away portions 40 from the angularly inclined tapered web sections, there are produced the radially extending portions 49 which substantially correspond to spokes and present a form of construction of maximum strength which is especially adapted to withstand the vertical shocks and stresses to which the wheel is subjected.

It will thus be seen that my invention provides a simple and efficient method for producing a disk wheel possessing the highly desirable properties of strength and durability.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

In the manufacture of disk wheels, the method of providing a mill section strip having a central raised flat portion, contiguous inclined portions and relatively thin flat side portions, cutting blanks from said strip substantially equal in width to the diameter of a completed wheel, and then rolling and beveling said blank across its entire length to form a wheel blank in the form of a truncated pyramid mounted upon a relatively thin flat base, the diagonal base length of said pyramid being substantially equal to the diameter of the completed wheel.

HOMER L. MUELLER.